(12) United States Patent
Logunov

(10) Patent No.: US 11,327,213 B2
(45) Date of Patent: May 10, 2022

(54) LIGHT DIFFUSING OPTICAL FIBERS HAVING UNIFORM ILLUMINATION ALONG DIFFUSION LENGTHS AND METHODS OF FORMING THE SAME

(71) Applicant: CORNING INCORPORATED, Corning, NY (US)

(72) Inventor: Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/758,632

(22) PCT Filed: Oct. 23, 2018

(86) PCT No.: PCT/US2018/056980
§ 371 (c)(1),
(2) Date: Apr. 23, 2020

(87) PCT Pub. No.: WO2019/083918
PCT Pub. Date: May 2, 2019

(65) Prior Publication Data
US 2020/0264359 A1  Aug. 20, 2020

Related U.S. Application Data

(60) Provisional application No. 62/576,229, filed on Oct. 24, 2017.

(51) Int. Cl.
*G02B 6/02* (2006.01)
*F21V 8/00* (2006.01)
(Continued)

(52) U.S. Cl.
CPC .......... *G02B 6/001* (2013.01); *C03B 37/0253* (2013.01); *C03B 37/02718* (2013.01);
(Continued)

(58) Field of Classification Search
None
See application file for complete search history.

(56) References Cited

U.S. PATENT DOCUMENTS

| 4,466,697 A | 8/1984 | Daniel |
| 6,551,346 B2 | 4/2003 | Crossley |

(Continued)

FOREIGN PATENT DOCUMENTS

| CN | 104010710 A | 8/2014 |
| CN | 204840698 U | 12/2015 |

(Continued)

OTHER PUBLICATIONS

International Search Report and Written Opinion of the International Searching Authority; PCT/US2018/056980; dated Jan. 30, 2019; 13 Pages; European Patent Office.

(Continued)

*Primary Examiner* — Michelle R Connelly
(74) *Attorney, Agent, or Firm* — Svetlana Z. Short; Payal Patel

(57) ABSTRACT

A light diffusing optical fiber includes a core, a cladding surrounding the core, an outer surface, and a plurality of scattering structures positioned within the core, the cladding, or both the core and the cladding. The plurality of scattering structures are configured to scatter guided light towards the outer surface, such that light including a wavelength of from about 450 nm to about 650 nm diffusing through the outer surface along a diffusion length of the light diffusing optical fiber includes a spectral attenuation percent relative range of about 15% or less.

20 Claims, 8 Drawing Sheets

(51) Int. Cl.
  *C03B 37/025* (2006.01)
  *C03B 37/027* (2006.01)
(52) U.S. Cl.
  CPC ...... *C03B 2203/10* (2013.01); *C03B 2205/40* (2013.01); *C03B 2205/72* (2013.01)

(56) References Cited

U.S. PATENT DOCUMENTS

| | | |
|---|---|---|
| 7,450,806 B2 | 11/2008 | Bookbinder et al. |
| 8,404,273 B2 | 3/2013 | Baumgart et al. |
| 8,545,076 B2 | 10/2013 | Bickham et al. |
| 8,585,681 B2 | 11/2013 | Boenig et al. |
| 8,591,087 B2 | 11/2013 | Bickham et al. |
| 8,620,125 B2 | 12/2013 | Button et al. |
| 8,779,386 B2 | 7/2014 | Bak |
| 8,805,141 B2 | 8/2014 | Fewkes et al. |
| 8,980,174 B2 | 3/2015 | Deutsch et al. |
| 9,039,966 B2 | 5/2015 | Anderson et al. |
| 9,067,059 B2 | 6/2015 | Bissig et al. |
| 9,259,513 B2 | 2/2016 | Bedwell et al. |
| 9,393,339 B2 | 7/2016 | Yeo et al. |
| 9,439,989 B2 | 9/2016 | Peterson et al. |
| 9,550,005 B2 | 1/2017 | Lin et al. |
| 9,704,422 B2 | 7/2017 | Logunov et al. |
| 9,795,466 B2 | 10/2017 | Loupis et al. |
| 9,808,647 B2 | 11/2017 | Rhodes et al. |
| 9,925,390 B2 | 3/2018 | Yehezkel |
| 9,943,379 B2 | 4/2018 | Gregg et al. |
| 10,046,070 B1 | 8/2018 | Lopez et al. |
| 10,166,402 B2 | 1/2019 | Brennan et al. |
| 10,183,144 B2 | 1/2019 | Tang et al. |
| 10,241,035 B2 | 3/2019 | Bonnick et al. |
| 2006/0085052 A1 | 4/2006 | Feuerstein et al. |
| 2009/0257910 A1 | 10/2009 | Segal |
| 2010/0124243 A1 | 5/2010 | Hussell et al. |
| 2010/0268151 A1 | 10/2010 | Mauge et al. |
| 2012/0275178 A1* | 11/2012 | Logunov ............ F21V 13/02 362/552 |
| 2013/0035629 A1 | 2/2013 | Soltz et al. |
| 2014/0140090 A1* | 5/2014 | Logunov ............ G09F 13/20 362/558 |
| 2015/0080709 A1 | 3/2015 | Chaturvedi |
| 2018/0036443 A1 | 2/2018 | Messerly |
| 2018/0147417 A1 | 5/2018 | Rantala |
| 2018/0178031 A1 | 6/2018 | Wu |
| 2018/0207302 A1 | 7/2018 | Vasilenko |
| 2018/0304094 A1 | 10/2018 | Hicks et al. |
| 2018/0326104 A1 | 11/2018 | Hawkins et al. |

FOREIGN PATENT DOCUMENTS

| | | |
|---|---|---|
| CN | 105396169 A | 3/2016 |
| CN | 106178280 A | 12/2016 |
| CN | 106178282 A | 12/2016 |
| CN | 108671243 A | 10/2018 |
| EP | 0559914 A1 | 9/1993 |
| EP | 2854944 A1 | 4/2015 |
| JP | 5546575 B2 | 7/2014 |
| KR | 10-1362704 B1 | 2/2014 |
| KR | 10-1851576 B1 | 4/2018 |
| KR | 10-2018-0049757 A | 5/2018 |
| KR | 10-1892996 B1 | 8/2018 |
| KR | 10-2018-0135256 A | 12/2018 |
| KR | 10-2018-0135257 A | 12/2018 |
| SG | 11201603590 Y | 12/2014 |
| SG | 11201407227 R | 10/2017 |
| WO | 2013/177674 A1 | 12/2013 |
| WO | 2015/168129 A1 | 11/2015 |
| WO | 2018/009864 A1 | 1/2018 |
| WO | 2019/025808 A1 | 2/2019 |
| WO | 2019/027478 A1 | 2/2019 |

OTHER PUBLICATIONS

Smith et al., "Transactions of the Optical Society (The C.I.E. Colorimetric Standards and Their Use)", vol. 33, No. 3, 1931-1932, pp. 5-134.

Tandon et al., "Nano-Engineered Optical Fibers and Applications", Nanophotonics, vol. 2, No. 5-6, 2013, pp. 383-392.

* cited by examiner

LIGHT DIFFUSING OPTICAL FIBERS HAVING UNIFORM ILLUMINATION ALONG DIFFUSION LENGTHS AND METHODS OF FORMING THE SAME

CROSS-REFERENCE TO RELATED APPLICATIONS

This application is a national stage application under 35 U.S.C. § 371 of International Application No. PCT/US2018/056980, filed on Oct. 23, 2018, which claims the benefit of priority under 35 U.S.C. § 119 of U.S. Provisional Application Ser. No. 62/576,229 filed on Oct. 24, 2017, the content of which is relied upon and incorporated herein by reference in its entirety.

TECHNICAL FIELD

The present disclosure generally relates to light diffusing optical fibers and methods for producing the same. More specifically, the present disclosure relates to light diffusing optical fibers that include scattering structures for providing a uniform illumination for a plurality of wavelengths along a diffusion length of the light diffusing optical fiber.

BACKGROUND

Optical fibers are used for a variety of applications where light needs to be delivered from a light source to a remote location. Optical telecommunication systems, for example, rely on a network of optical fibers to transmit light from a service provider to system end-users.

Telecommunication optical fibers are designed to operate at near-infrared wavelengths in the range from 800 nm to 1675 nm where there are only relatively low levels of attenuation due to absorption and scattering. This allows most of the light injected into one end of the fiber to exit the opposite end of the fiber with only insubstantial amounts exiting peripherally through the sides of the fiber.

Because optical fibers are typically designed to efficiently deliver light from one end of the fiber to the other end of the fiber over long distances, very little light escapes from the sides of the typical fiber, and, therefore optical fibers are not considered to be well-suited for use in forming an extended illumination source. Yet, there are a number of applications such as special lighting, signage, or biological applications, including bacteria growth and the production of photo-bioenergy and biomass fuels, where select amounts of light need to be provided in an efficient manner to the specified areas. For biomass growth there is a need to develop processes that convert light energy into biomass-based fuels. For special lighting, the light source needs to be thin, flexible, and easily modified to variety of different shapes.

Accordingly, a need exists for light diffusing optical fibers with uniform illumination along the length and improved methods of fabricating light diffusing optical fibers with uniform illumination along the length.

BRIEF SUMMARY

According to the subject matter of the present disclosure, a light diffusing optical fiber includes a core, a cladding surrounding the core, an outer surface, and a plurality of scattering structures positioned within the core, the cladding, or both the core and the cladding. The plurality of scattering structures are configured to scatter guided light towards the outer surface, such that light including a wavelength of from about 450 nm to about 650 nm diffusing through the outer surface along a diffusion length of the light diffusing optical fiber includes a spectral attenuation percent relative range of about 15% or less.

In accordance with another embodiment of the present disclosure, a method for producing a light diffusing optical fiber includes drawing the light diffusing optical fiber from an optical fiber preform in a draw furnace along a draw pathway. Drawing the light diffusing optical fiber includes heating the optical fiber preform at a draw temperature within the draw furnace and applying a draw tension to the light diffusing optical fiber. The light diffusing optical fiber includes a core, a cladding surrounding the core, an outer surface, and a plurality of scattering structures positioned within the core, the cladding, or both the core and the cladding. The plurality of scattering structures are configured to scatter guided light towards the outer surface, such that light including a wavelength of from about 450 nm to about 560 nm diffusing through the outer surface along a diffusion length of the light diffusing optical fiber includes a spectral attenuation percent relative range of about 15% or less and a correlated color temperature of from about 2700 K to about 8000 K.

In accordance with yet another embodiment of the present disclosure, a method includes drawing a first light diffusing optical fiber from an optical fiber preform in a draw furnace along a draw pathway at a first draw speed. Drawing the first light diffusing optical fiber includes heating the optical fiber preform at a first draw temperature within the draw furnace, and applying a first draw tension to the first light diffusing optical fiber. The first light diffusing optical fiber includes a core, a cladding surrounding the core, an outer surface, and a plurality of gas-filled voids positioned within the core, the cladding, or both the core and the cladding. The plurality of gas-filled voids includes a first void volume fraction and a first average cross sectional size. The method further includes directing light from a light source into the first light diffusing optical fiber such that a portion of the light diffuses through the outer surface of the first light diffusing optical fiber, measuring a spectral attenuation percent relative range of the light diffusing through the outer surface of the first light diffusing optical fiber, and drawing a second light diffusing optical fiber from the optical fiber preform into the draw furnace along the draw pathway at a second draw speed. Drawing the second light diffusing optical fiber includes heating the optical fiber preform at a second draw temperature within the draw furnace, and applying a second draw tension to the second light diffusing optical fiber. The second light diffusing optical fiber includes a core, cladding surrounding the core, an outer surface and a plurality of scattering structures positioned within the core, the cladding, or both the core and the cladding. The plurality of scattering structures includes a second void volume fraction and a second average cross sectional diameter and are configured to scatter guided light towards the outer surface, such that light including a wavelength of from about 450 nm to about 560 nm diffusing through the outer surface along a diffusion length of the second light diffusing optical fiber includes a second spectral attenuation percent relative range that is about 15% or less and is less than the spectral attenuation percent relative range of the first light diffusing optical fiber.

Although the concepts of the present disclosure are described herein with primary reference to light diffusing optical fibers with uniform illumination along the length, it is contemplated that the concepts will enjoy applicability to any light diffusing optical fiber.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
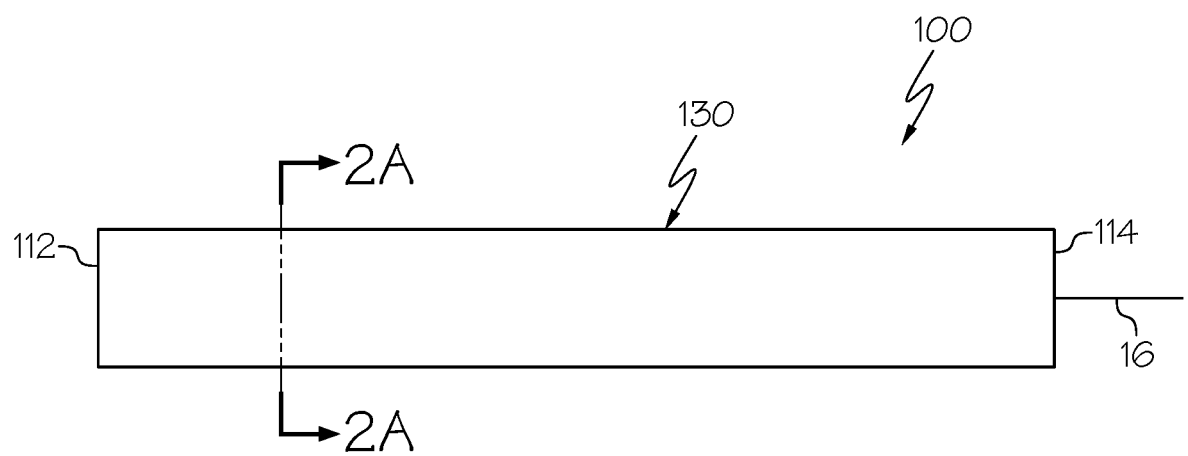
FIG. 1 schematically depicts a side view of a section of an example light diffusing optical fiber, according to one or more embodiments shown and described herein.
Figure 2A:
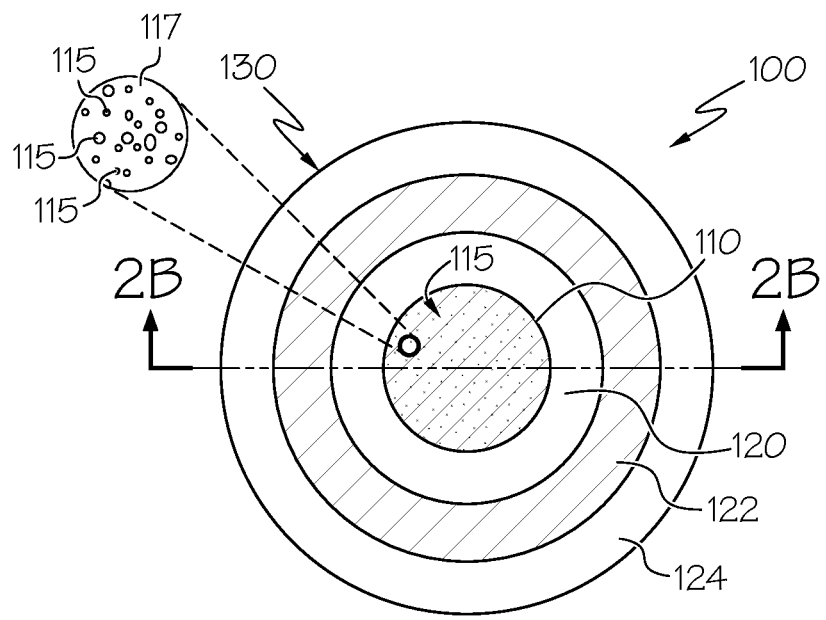
FIG. 2A schematically depicts a cross-section of the light diffusing fiber of FIG. 1 as viewed along the direction 2A-2A, according to one or more embodiments shown and described herein.
Figure 2B:
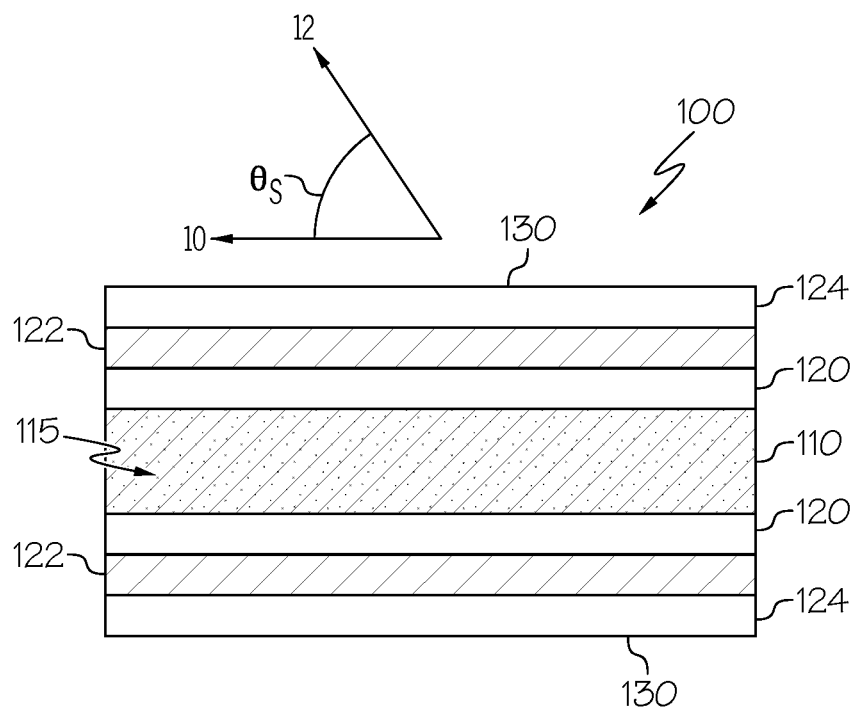
FIG. 2B schematically depicts a cross-section of the light diffusing fiber of FIG. 2A as viewed along the direction 2B-2B, according to one or more embodiments shown and described herein.

Referring now to FIGS. 1, 2A, and 2B a light diffusing optical fiber 100 comprising a first end 112, a second end 114 opposite to the first end 112, a core 110, a cladding 120 surrounding the core 110, an outer surface 130, and a plurality of scattering structures 115 positioned within the core 110, the cladding 120, or both the core 110 and the cladding 120 is schematically depicted. In particular, FIG. 1 depicts a schematic side view of a section of the light diffusing optical fiber 100 and depicts a central axis 16 ("centerline") of the light diffusing optical fiber 100, FIG. 2A depicts a schematic cross-section of the light diffusing optical fiber 100 as viewed along the direction 2A-2A shown in FIG. 1, and FIG. 2B depicts another schematic cross-section of the light diffusing optical fiber 100 as viewed along the direction 2B-2B shown in FIG. 2A. Further, the light diffusing optical fiber 100 can be, for example, any one of the various types of optical fiber with a scattering-structured fiber region having scattering structures 115 arranged periodically or non-periodically, for example, gas-filled voids.

In operation, the plurality of scattering structures 115 are configured to scatter guided light (e.g., light output by a light source such as a comprise a light-emitting diode (LED), a laser diode, a multimode laser diode, single mode laser diode, a SiP laser diode, a VCSEL laser diode, or another type of semiconductor laser diode) that is propagating along the light diffusing optical fiber 100 toward the outer surface 130 of the light diffusing optical fiber 100 such that a portion of the guided light diffuses through the outer surface 130 along a diffusion length of the light diffusing optical fiber 100. As used herein, "diffusion length," is the length of the light diffusing optical fiber 100 extending from the first end 112 of the light diffusing optical fiber 100 (or from any end receiving input light) to a location along the length of the light diffusing optical fiber 100 where 90% of the guided light has diffused from the light diffusing optical fiber 100. As used herein, the term "light-diffusing" means that light scattering is substantially spatially continuous along at least a portion of the length of the light diffusing optical fiber 100, i.e., there are no substantial jumps or discontinuities such as those associated with discrete (e.g., point) scattering. Thus, the concept of substantially continuous light emission or substantially continuous light scattering as set forth in the present disclosure refers to spatial continuity. Moreover, as used herein, terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

Referring now FIGS. 2A and 2B, example cross sections of an embodiment of the light diffusing optical fiber 100 comprising the core 110, the cladding 120 surrounding the core 110, the outer surface 130 and the plurality of scattering structures 115 are depicted. The core 110 may comprise a glass core, for example, silica, germania doped silica, fluorine-doped silica. Further, the core 110 comprises an index of refraction, n. In some embodiments, the index of refraction of the core 110 may be from about 1.3 to about 1.55, for example, 1.35, 1.4, 1.42, 1.44, 1.45, 1.458, 1.46, 1.48, or the like. Further, the core 110 may have a radius of from about 10 μm to about 600 μm. In some embodiment, the radius of the core 110 is from about 30 μm to about 400 μm. In other embodiments, the radius of the core 110 is about 125 μm to about 300 μm. In still other embodiments, the radius of the core 110 is about 50 μm, 60 μm, 70 μm, 80 μm, 90 μm, 100 μm, 120 μm, 140 μm, 160 μm, 170 μm, 180 μm, 200 μm, 220 μm, 240 μm, or 250 μm. In yet other embodiments, the radius of the core 110 is about 250 μm to about 2.5 mm. Optionally, the radius of the core 110 is about 1 mm to about 2.5 mm. Optionally, the radius of the core 110 is about 1 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, or 2.5 mm. Further, the cladding 120 may be a glass cladding, for example, pure silica, F-doped silica, or F (fluorine)/B (boron) co-doped silica, or a polymer cladding. In one embodiment, the cladding 120 comprises a low index polymeric material such as UV or thermally curable fluoroacrylate, such as PC452 available from SSCP Co. Ltd. 403-2, Moknae, Ansan, Kyunggi, Korea, or silicone. In other embodiments, the cladding 120 comprises a urethane acrylate, such as CPC6, manufactured by DSM Desotech, Elgin, Ill. In some embodiments, the cladding 120 comprises a high modulus coating.

As depicted in FIGS. 2A and 2B, the cladding 120 surrounds the core 110 in direct contact with the core 110. The cladding 120 generally extends from the outer radius of the core 110. In some embodiments described herein, the radial width of the cladding is greater than about 10 μm, greater than about 20 μm, greater than about 50 μm or greater than about 70 μm. In some embodiments, the cladding 120 has a thickness of about 10 μm, 20 μm, 30 μm, 40 μm, 50 μm, 60 μm, 70 μm, 80 μm, 90 μm, or 100 μm. The cladding 120 generally has an index of refraction, which is less than the index of refraction of the core 110 to facilitate total internal reflection of light propagating along the core 110. In some embodiments, the core 110, the cladding 120, or both may include an updopant or a downdopant. As used herein, an "updopant" is a dopant, which has a propensity to raise the refractive index relative to pure undoped silica, and a "downdopant" is a dopant, which has a propensity to lower the refractive index relative to pure undoped silica. For example, the cladding 120 comprises a silica glass, which is down-doped with a downdopant, such as, for example, fluorine. Further, the light diffusing optical fiber 100 will may comprise a length (e.g., a length between the first end 112 and the second end 114) of from about 0.1 m to about 100 m, for example, about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

In some embodiments, the core 110 of light diffusing optical fiber 100 comprises a glass matrix ("glass") 117 with a plurality of periodically or non-periodically disposed scattering structures 115 (e.g., "voids") situated therein, such as the example voids shown in detail in the magnified inset of FIG. 2A. The scattering structures 115 comprise gas-filled voids, scattering particles, such as ceramic materials, dopants, or the like. The scattering structures 115 may occur throughout the core 110 (as depicted in FIGS. 2A and 2B), or may occur near the interface of the core 110 and the cladding 120 (e.g., the core-cladding boundary), or may occur in an annular ring within the core 110. Some examples of light-diffusing optical fibers having randomly arranged and randomly sized voids (also referred to as "random air lines" or "nanostructures" or "nano-sized structures" or "scattering structures") are described in U.S. Pat. No. 7,450, 806, and in U.S. patent application Ser. Nos. 12/950,045, 13/097,208, and 13/269,055, herein incorporated by reference in their entirety. Alternatively, the light diffusing optical fiber 100 may have a "roughened" core 110, where the irregularities on the surface of the core 110 at the core-cladding boundary causes light scatter. Other types of light diffusing optical fibers may also be utilized. In operation, the light diffusing optical fiber 100 may undergo scattering-induced attenuation (i.e., attenuation due to light lost through the outer surface 130 of the light diffusing optical fiber 100, not due to absorption of scattering particles within the core 110) of about 50 dB/km or greater, for example from about 100 dB/km to about 60000 dB/km at an illumination wavelength (e.g., the wavelength(s) of emitted radiation).

In embodiments in which the scattering structures 115 comprise gas-filled voids, the gas-filled voids may be arranged in a random or organized pattern and may run parallel to the length of the light diffusing optical fiber 100 or may be helical (i.e., rotating along the long axis of the light diffusing optical fiber 100). While not intending to be limited by theory, scattering of light depends on size of the scattering particles where the size of the scattering particles have a strong wavelength dependence, for example, blue light scatters stronger than red light (e.g. Rayleigh, Mie scattering). However, as described herein, controlling the shape and distribution of voids achieves a flat or uniform spectral attenuation curve.

Further, the light diffusing optical fiber 100 may comprise a large number of gas-filled voids, for example more than 50, more than 100, or more than 200 voids in an orthogonal cross section of the fiber. As used herein "orthogonal cross section" refers to any arbitrary cross section taken along the length of the light diffusing optical fiber that is orthogonal to the propagation direction of guided light, (e.g., the propagation direction 10 of guided light as depicted in FIG. 2B). The scattering structures 115 (e.g., gas-filled voids) at any orthogonal cross section of the light diffusing optical fiber 100 comprise a void volume fraction. As used herein, the "void volume fraction" refers to the ratio of the total area of the scattering structures 115 (e.g., glass-filled voids) to the total area of glass matrix 117 present in an orthogonal cross section of the light diffusing optical fiber 100. The void volume fraction of an arbitrary orthogonal cross section of the light diffusing optical fiber 100 may be from about 1:1000 to about to 1:5 such as from about 1:100 to about 1:10 (e.g., from about 0.5% to about 20%, such as from about 1% to about 10%, for example 2%, 3%, 4%, 5%, 6%, 7%, 8%, 9%, or the like). In operation, the scattering-induced attenuation of light from the light diffusing optical fiber 100 is a function of "void volume fraction" and average cross-sectional size of the voids where larger voids result in higher scattering-induced attenuation.

The gas-filled voids may contain, for example, $SO_2$, Kr, Ar, $CO_2$, $N_2$, $O_2$, or mixtures thereof. In some embodiments, the scattering structures 115 may comprise voids that contain a vacuum with substantially no gas. However, regardless of the presence or absence of any gas, the average refractive index in region of the core 110, the cladding 120, or the core-cladding boundary that comprises the plurality of scattering structures 115 is lowered due to the presence of voids. Further, the plurality of scattering structures 115 such as voids can be randomly or non-periodically disposed in the core 110, the cladding 120, or the core-cladding boundary; however, in other embodiments the voids may be periodically disposed.

The cross-sectional size (e.g., diameter) of the voids, such as gas-filled voids (or other scattering particles) may be from about 50 nm to about 100 μm and the length may vary from about 1 mm to about 100 m (i.e., a few mm to a few meters). In some embodiments, the cross sectional size of the voids (or other scattering particles) is about 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1 μm, 10 μm, 20 μm, 30 μm, 40 μm, 50 μm, 60 μm, 70 μm, 80 μm, 90 μm, or 100 μm. In some embodiments, the length of the voids is about 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, 1 m, 2 m, 3 m, 4 m, 5 m, 10 m, 20 m, or 50 m. Furthermore, the scattering structures 115 may comprise a non-spherical taper shape. The non-spherical taper shapes may randomly start and stop along the length of the light diffusing optical fiber 100 to produce high scattering efficiency and desired wavelength dependence. The cross-sectional size and length of the gas-filled voids depends on the gas used, consolidation conditions, and draw process conditions. In embodiments, an average cross-sectional size (e.g., average diameter) of the gas-filled voids measured at any orthogonal cross section of the light diffusing optical fiber 100 may be from about 50 nm to about 100 μm, for example, from about 250 nm to about 50 µm, from about 500 nm to about 10 µm, from about 1 µm to about 5 µm, or the like.

Referring still to FIGS. 2A and 2B, the light diffusing optical fiber 100 may further comprise one or more additional layers, for example, coatings, jackets, or the like. For example, as depicted in FIGS. 2A and 2B, the light diffusing optical fiber 100 may comprise a first coating layer 122 and a secondary scattering layer 124. The first coating layer 122 may comprise a substantially clear layer surrounding the core 110 and cladding 120 for ease of mechanical handling, for example, a polymer coating. In some embodiments, the first coating layer 122 may comprise scattering particles and the secondary scattering layer 124 may be free of scattering particles. Further, the secondary scattering layer 124 may be positioned surrounding the core 110, the cladding 120, and in some embodiments, the first coating layer 122. The secondary scattering layer 124 may comprise a base material (for example, a polymer) and a scattering material positioned in the base material. In operation, the secondary scattering layer 124 may facilitate uniform angular scattering over a large angular range (e.g., 40 to 120°, or 30° to 130°, or 15 to 150°). For example, the light diffusing optical fiber 100 is configured to provide substantially uniform illumination due to scattering, such that the difference between the minimum and maximum scattering illumination intensity is less than 50% of the maximum scattering illumination intensity, for all viewing angles from about 40 to about 120 degrees.

In some embodiments, the secondary scattering layer 124 includes a base material (for example, a polymer) and a scattering material (e.g., a scattering agent) positioned in the base material. In some embodiments, the base material comprises a polymer, for example, a liquid polymer or prepolymer material into which the scattering agent could be added, for example, an acrylate-based, such as CPC6, manufactured by DSM Desotech, Elgin, Ill., or silicone-based polymer. Moreover, during manufacture, the secondary scattering layer 124 may be applied to the light diffusing optical fiber 100 as a liquid and then converted to a solid after application to the light diffusing optical fiber 100.

The scattering material comprises a material that has a refractive index differential from the base material of the secondary scattering layer 124 (e.g. a base polymer), for example, a refractive index differential of more than 0.05 (e.g., the difference in refractive indices between the base material and the scattering material is greater than 0.05). In some embodiments, the difference in refractive indices between base material and the scattering material is at least 0.1. That is, the index of refraction of the scattering material may be at least 0.1 larger than the index of refraction of the base material (e.g., of the polymer or other matrix material) of the secondary scattering layer 124. In operation, the scattering material provides angle independent distribution of light scattered from the core 110 of the light diffusing optical fiber 100.

The scattering material can be solid particles (e.g., organic or inorganic solid particles), liquid droplets, or gas bubbles. Example solid organic particles include pigments, polymers, or any organic material that can be incorporated into the base material as a powder. If the scattering material is inorganic, the scattering particles can be, for example, pigments, oxides, or mineral fillers. Both organic and inorganic scattering particles can be generated, from grinding a solid, or may comprise small particles initially (for example, from emulsion polymerization or sol gels). In some embodiments, the solid scattering particles are inorganic oxides like silica ($SiO_2$), alumina ($Al_2O_3$), zirconia ($ZrO_2$), titania ($TiO_2$), cerium oxide ($CeO_2$), tin oxide ($SnO_2$), and antimony oxide ($Sb_2O_3$). For example, titania based scattering particles may be a white ink. Ground glass, ceramics, or glass-ceramics can also be utilized as scattering particles. Ground silicates or mineral fillers like quartz, talc, mullite, cordierite, clay, nepheline syenite, calcium carbonate, aluminum trihydrate, barium sulfate, wallastonite, mica, feldspar, pyrophyllite, diatomite, perlite, and cristobalite can utilized in the secondary scattering layer 124 as scattering material.

Further, scattering material may be generated in-situ, via crystallization and/or phase separation, for example, polyethylene, polypropylene, syndiotactic polystyrene, nylon, polyethylene terephthalate, polyketones, and polyurethanes where the urethane functional groups align and crystallize during solidification. For example, during the cure or solidification of the material that becomes the secondary scattering layer 124, crystals may form that function as light scattering sites. Further, when the secondary scattering layer 124 is cured and/or solidified, the material of the scattering layer (e.g., the base material and the scattering material) may become incompatible causing the material to phase separate, forming droplets or particles that can scatter light, thus forming scattering sites. Examples of these would be, but are not limited to, styrene-butadiene-styrene block copolymers, polymethyl methacrylate in polystyrene, and acrylonitrile-butadiene-styrene.

The average diameter of the scattering material may be from about 200 nm to about 10 µm, for example, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, 10 µm, or diameters there between. In embodiments in which the scattering material comprises scattering particles, the cross-sectional size of the scattering particles within the secondary scattering layer 124 may comprise $0.1\lambda$ to $10\lambda$ where $\lambda$ is the wavelength of light propagating through the light diffusing optical fiber 100. In some embodiments, the cross-sectional size of the scattering particles is greater than $0.2\lambda$ and less than $5\lambda$ for example, from about $0.5\lambda$ to about $2\lambda$. The amount of scattering particles can vary from about 0.005% to 70% by weight, for example, 0.01% to 60%, 0.02% to 50%, or the like. In general, the thinner the secondary scattering layer 124, the larger amount of scattering particles should be present within the secondary scattering layer 124.

The concentration of the scattering particles may vary along the length of the light diffusing optical fiber 100 or may be constant and may be a weight percent sufficient to provide even (e.g., angle independent) scattering of the light. In some embodiments, the weight percentage of the scattering particles in the secondary scattering layer 124 comprises about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, or 50%. In some embodiments, the scattering material may comprise a sublayer within the secondary scattering layer 124. For example, in some embodiments, the sublayer may have a thickness of about 1 µm to about 5 µm.

Referring still to FIGS. 2A and 2B, in operation, the secondary scattering layer 124 may facilitate uniform angular scattering over a large angular range (e.g., 40° to 120°, or 30° to 130°, or 15 to 150°). For example, unscattered, guided light propagates along the light diffusing optical fiber 100 from the light output device 150 in the propagation direction 10. Scattered light is shown exiting the light diffusing optical fiber 100 in direction 12 at a scattering angle $\theta_S$, which is the angular difference between the propagation direction 10 of guided light propagating along the light diffusing optical fiber 100 and the direction 12 of the scattered light when it leaves the light diffusing optical fiber 100. In some embodiments, the intensities of the spectra when the scattering angle $\theta_S$ is from about 15° to about 150°, or from about 30° to about 130° are within ±50%, ±30%, ±25%, ±20%, ±15%, ±10%, or ±5% as measured at the peak wavelength. In some embodiments, the intensities of the spectra when the scattering angle $\theta_S$ is between all angles within 30° and 130° or 40° and 120° are at least within ±50%, for example ±30%, ±25%, ±20%, ±15%, ±10%, or ±5% as measured at the peak wavelength. Accordingly, the light diffusing optical fiber 100 is configured to provide substantially uniform illumination due to scattering, such that the difference between the minimum and maximum scattering illumination intensity is less than 50% of the maximum scattering illumination intensity, for all viewing angles (e.g., an angle between the propagation direction 10 and a viewing location of the viewer) between at least 40 degrees and 110 degrees, for example for all viewing angles between 40 degrees and 120 degrees. According to some embodiments, the difference between the minimum and maximum scattering illumination intensity is not greater than 30% of the maximum scattering illumination intensity.

In operation, the light diffusing optical fiber 100 may have a scattering induced attenuation loss of greater than about 0.2 dB/m at a wavelength of 550 nm. For example, in some embodiments, the scattering induced attenuation loss (attenuation loss due to the scattering structures 115) may be greater than about 0.5 dB/m, 0.6 dB/m, 0.7 dB/m, 0.8 dB/m, 0.9 dB/m, 1 dB/m, 1.2 dB/m, 1.4 dB/m, 1.6 dB/m, 1.8 dB/m, 2.0 dB/m, 2.5 dB/m, 3.0 dB/m, 3.5 dB/m, or 4 dB/m, 5 dB/m, 6 dB/m, 7 dB/m, 8 dB/m, 9 dB/m, 10 dB/m, 20 dB/m, 30 dB/m, 40 dB/m, or 50 dB/m at 550 nm. Moreover, as described in detail below, the scattering induced attenuation loss of light diffusing optical fiber 100 may be substantially uniform for a range of wavelengths of light and, as such, the light diffusing optical fiber 100 may output light at a substantially uniform intensity for a variety of different wavelengths.

Figure 3:
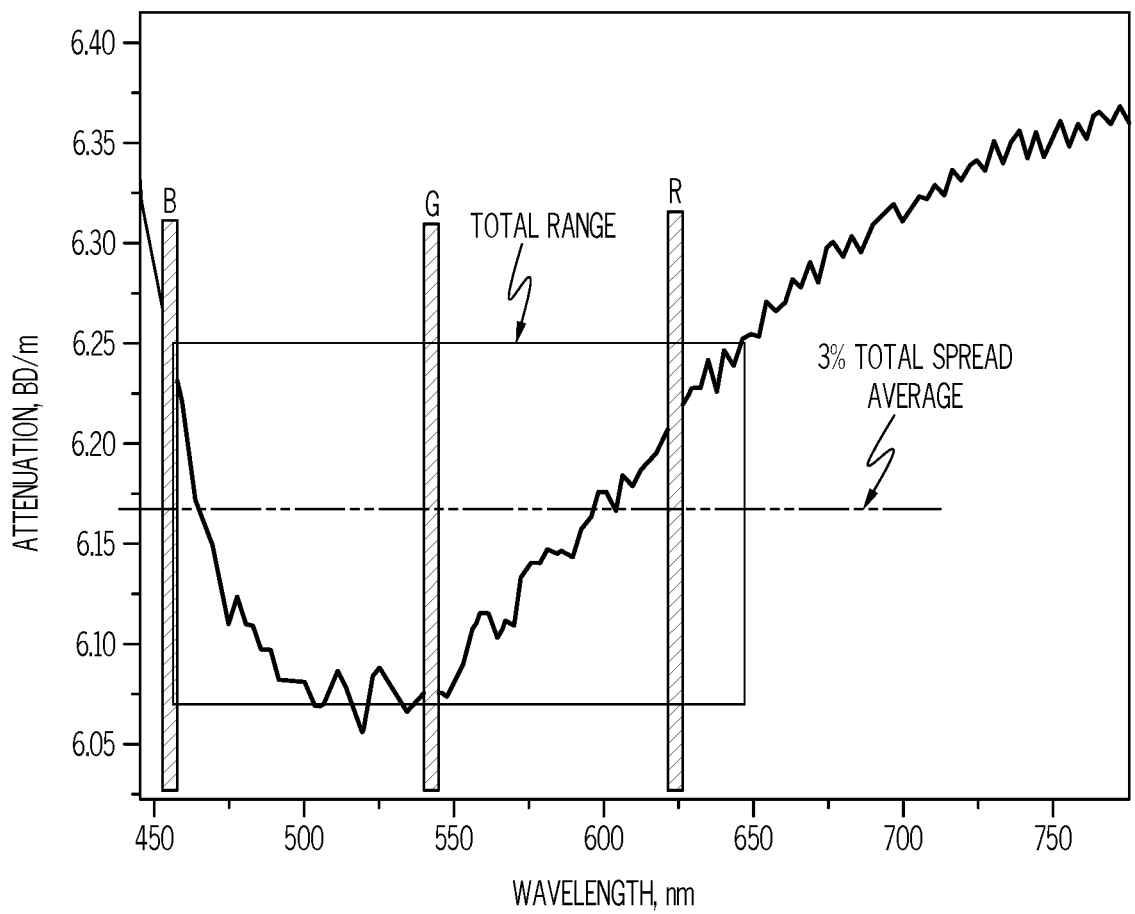
FIG. 3 graphically depicts scattering induced attenuation loss of a range of wavelengths of guided light propagating along the light diffusing optical fiber, according to one or more embodiments shown and described herein.

Referring now to FIG. 3, scattering induced attenuation loss of a range of wavelengths of guided light propagating along the light diffusing optical fiber 100 is graphically depicted. More specifically, FIG. 3 graphically depicts the scattering induced attenuation loss of a light diffusing optical fiber 100 having a spectral attenuation percent relative range of about 3%. As used herein, "spectral attenuation percent relative range" defines the percent difference from a minimum to a maximum attenuation loss (for example, in units of dB/m) over a particular range of wavelengths. In some embodiments, the spectral attenuation percent relative range for wavelengths from about 450 nm to about 650 nm is about 15% or less, about 14% or less, about 13% or less, 12% or less, about 11% or less, 10% or less, about 9% or less, 8% or less, about 7% or less, about 6% or less, about 5% or less, about 4% or less, about 3% or less, about 2% or less, or about 1% or less. A spectral attenuation percent relative range of about 15% or less may be considered "uniform." As used herein, "uniform illumination" refers to illumination along the length of the light diffusing optical fiber 100 in which the intensity of light emitted from the light diffusing optical fiber 100 does not vary by more than 15% over the specified length for a plurality of wavelengths. As an illustrative example, the light diffusing optical fiber 100 may have a scattering induced attenuation loss of light having a wavelength of about 500 nm that is within about 15% of a scattering induced attenuation loss of light having a wavelength of about 600 nm. As such, the light diffusing optical fiber 100 may output light at each of these wavelengths (simultaneously or at different times) at similar intensities such that a viewer may perceive each of these wavelengths as having substantially the same brightness.

While not intending to be limited by theory, a light diffusing optical fiber 100 comprising a generally flat spectral attenuation may also improve the maintenance (e.g., uniformity) of a chromaticity (e.g., a chromaticity point, a color point, or a perceived color) of light scattering outward from the light diffusing optical fiber 100. As used herein, "chromaticity" refers to the quality of the color of the light independent of brightness. Chromaticity is a combination of the hue and saturation in a color, where hue refers to a color as perceived by a viewer (e.g., red, orange, green, blue, etc.) and saturation refers to the vividness or dullness of the color, for example, how close the color is to either gray or a pure hue of the color. While not intending to be limited by theory, maintenance of chromaticity along the light diffusing optical fiber 100 refers to a change or lack thereof of hue and saturation generated by one or more input wavelengths defining an initial chromaticity (e.g., input into the light diffusing fiber by a light source optically coupled to the light diffusing optical fiber 100) along the length of the light diffusing optical fiber 100. Thus, a light diffusing optical fiber 100 having a generally flat spectral attenuation (e.g., a spectral attenuation percent relative range of about 15% or less) over the specified length for a plurality of wavelengths will be capable of maintaining the specific combination of one or more wavelengths that generate the initial chromaticity, along the diffusion length of the light diffusing optical fiber 100. By maintaining the combination of the one or more wavelengths, the chromaticity along the light diffusing optical fiber 100 may be maintained such that a viewer may not perceive a change in chromaticity. Similarly, a light diffusing optical fiber 100 having a generally flat spectral attenuation over the specified length for a plurality of wavelengths may also diffuse with uniform illumination at one or more than one different chromaticities along the same length of light diffusing optical fiber 100 without a noticeable difference in a change in chromaticity. Viewer perception or an unnoticeable change in chromaticity may be quantified by a MacAdam ellipse 430, which is described in more detail below.

Figure 4:
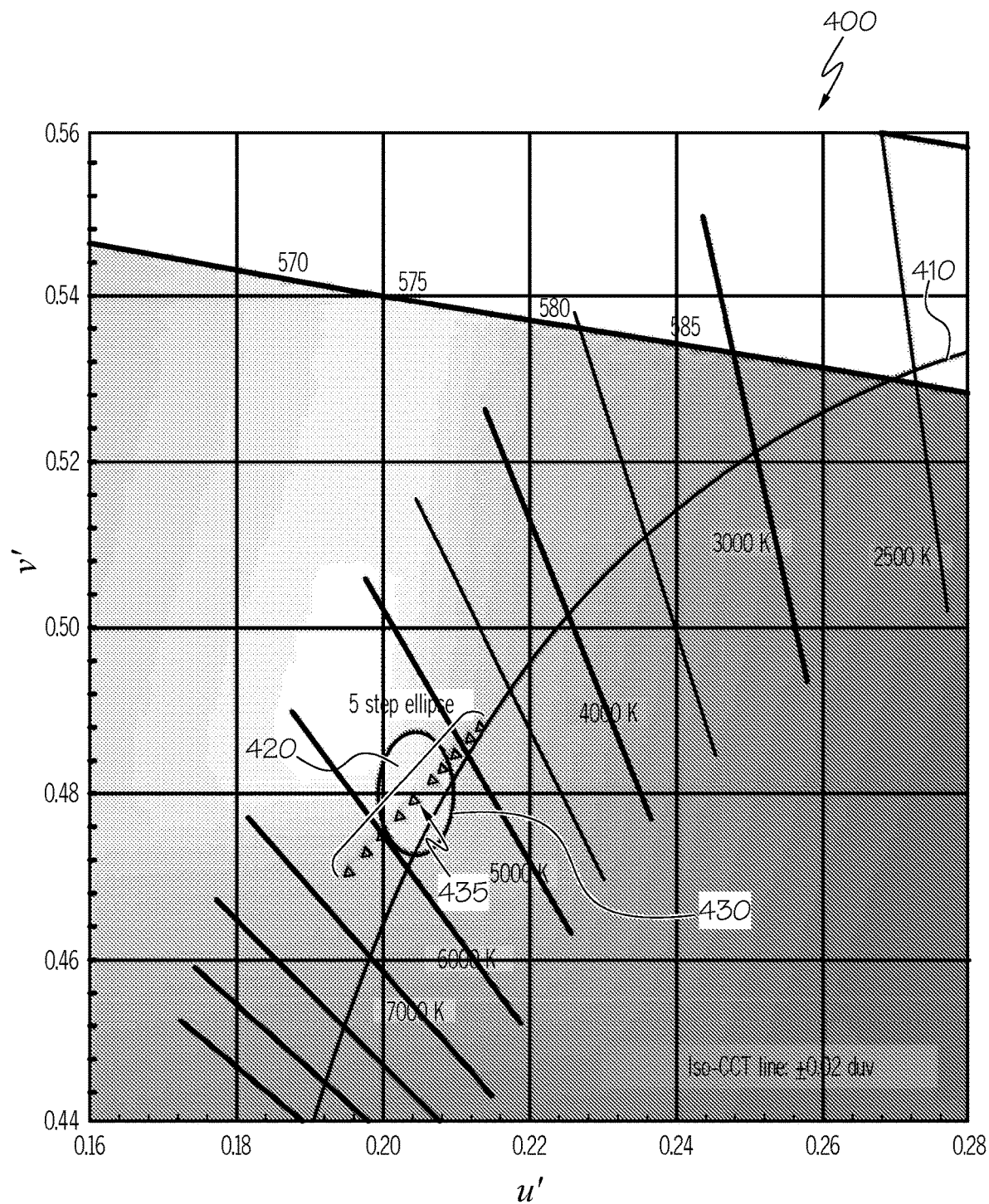
FIG. 4 graphically depicts a CIE u' v' plot showing simulation results for light diffusing optical fibers having a spectral attenuation with a range of +10% to −10%, according to one or more embodiments shown and described herein.

Moreover, chromaticity may be plotted on a chromaticity space, for example, a CIE 1931 chromaticity space or a CIE 1976 chromaticity space (as depicted in FIG. 4). While not intending to be limited by theory, the CIE 1931 chromaticity space depicts chromaticity using chromaticity coordinates x and y, which are based on standard tristimulus values (XYZ), as set by the Commission Internationale de l'Eclairage (CIE), see T. Smith and J. Guild, *The C.I.E. Colorimetric Standards and Their Use,* 33 TRANS. OP. SOC. 73-134 (1931), herein incorporated by reference in its entirety. While not intending to be limited by theory, the tristimulus values are a mathematical construct to uniquely represent a perceivable hue and are derived from the relative intensities of the primary colors. Moreover, while still not intending to be limited by theory, the tristimulus values may be converted into the chromaticity coordinates x and y to depict chromaticity in two dimensional coordinates using the CIE 1931 chromaticity space.

Further, the CIE 1976 chromaticity space (a portion of which is shown in FIG. 4) depicts chromaticity using coordinates u' and v', which represent differences in perceived chromaticity (e.g., chromaticity as perceived by a viewer). The u' and v' coordinates may be derived from the x and y coordinates of the CIE 1931 chromaticity space and may be used to show differences in chromaticity as geometric distances. Thus, the u' and v' coordinates may be used to spatially represent how different one chromaticity is from another chromaticity. The CIE 1976 chromaticity space is described in more detail in Colorimetry, second edition: CIE publication 15.2, Vienna: Bureau Central CIE, 1986, herein incorporated by reference in its entirety.

While still not intending to be limited by theory, both the CIE 1931 chromaticity space and the CIE 1976 chromaticity space depict a "Planckian locus," which represents the chromaticity of light emitted by a black body when the black body is heated over a range of temperatures. In the portion of the CIE 1976 chromaticity space depicted in FIG. 4, the Planckian locus 410 is represented by the component number 410. As described below, the Planckian locus 410 provides a reference location of white light and near white light within a chromaticity space. While not intending to be limited by theory, a "black body" refers to a theoretical object that absorbs all electromagnetic radiation comprising a range of wavelengths irradiating the black body, for example, the wavelengths of visible light. Because the black body absorbs electromagnetic radiation, the black body also emits electromagnetic radiation at temperatures above absolute zero (e.g., above 0 Kelvin (K)).

Further, electromagnetic radiation emitted by the black body is white or near white and the particular chromaticity and spectral distribution of this emitted white or near white electromagnetic radiation depends on the temperature of the black body. The temperature of black body emission is referred to as a "color temperature" and each color temperature defines the chromaticity of light located on the Planckian locus 410 (e.g., each color temperature defines the specific white or near white chromaticity of light located on the Planckian locus 410). While not intended to be limited by theory, as the temperature of the black body increases, the spectral distribution shifts toward the shorter wavelengths and, as such, for higher temperatures, the chromaticity shifts toward blue hues and for lower temperatures, the chromaticity shifts toward the red hues.

Moreover, while color temperature defines the chromaticity of light located on the Planckian locus 410, other chromaticities may be defined by a "correlated color temperature," (CCT) which is the color temperature of the point on the Planckian locus 410 that is nearest the chromaticity of interest when the Planckian locus 410 is plotted using the u'-v' coordinates of the CIE 1976 chromaticity space (e.g., because the u'-v' coordinates spatially represent the differences in chromaticity as geometric distances). Moreover, as used herein, a line on the CIE 1976 chromaticity space extending between and/or through the chromaticity of interest and the point nearest the chromaticity of interest on the Planckian locus 410 (e.g., extending perpendicular to a tangent line at the point nearest the chromaticity of interest on the Planckian locus 410) is referred to as an "isothermal line." Each chromaticity point along an isothermal line has the same CCT. Generally, CCT is a way of describing the color appearance of "white" light. As an example, for purposes of wavelengths in the visible spectrum, changes in the color temperature manifest in either "warmer" or "cooler" versions of an input visible wavelength. Warm light generally has low CCT values (e.g., 2700 K to 3000 K) while cool light has high CCT values (e.g., 4000 K to 6500 K).

As used herein, a dimensionless distance between two chromaticity points on a chromaticity space (e.g., the CIE 1931 chromaticity space or the CIE 1976 chromaticity space) is referred to as a "chromaticity distance." For example, when comparing an initial or measured chromaticity to a target chromaticity or another measured chromaticity at a specified length of the light diffusing optical fiber 100, the chromaticity distance may be used to define the distance there between on the CIE 1931 chromaticity space or the CIE 1976 chromaticity space. One example chromaticity distance is the distance between a chromaticity of interest and a point on the Planckian locus 410 nearest the chromaticity of interest (e.g., a distance measured along an isothermal line), which is referred to herein and in the art as the distance u-v or "Duv." The Duv is a positive or negative dimensionless number, where a positive Duv refers to points above the Planckian locus 410 on the CIE 1976 chromaticity space and a negative Duv refers to points below the Planckian locus 410 on the CIE 1976 chromaticity space. While the Duv is one example chromaticity distance, it should be understood that a chromaticity distance may refer to the distance between any two points on a chromaticity space or between a point on the chromaticity space and a line on the chromaticity space 400 (e.g., an isothermal line). As one non-limiting example, the chromaticity distance may be measured between an individual chromaticity point and an isothermal line representing a particular color coordinated temperature (e.g., the shortest distance between the chromaticity point and any location along the isothermal line). As another non-limiting example, the chromaticity distance may be measured between two individual points of chromaticity.

Referring again to FIG. 4, a CIE 1976 chromaticity space 400 having a Planckian locus 410 is graphically depicted to show example simulation results for light diffusing optical fibers 100 having a spectral attenuation with a range of +10% to −10% (i.e., spectral attenuation percent relative range of about 20%).

Additionally, a MacAdam ellipse 430 is also shown on the CIE 1976 chromaticity space 400. A MacAdam ellipse 430 is a region on a CIE diagram (for example, the CIE 1976 chromaticity space 400), which defines chromaticities each having colors which are indistinguishable to the average human eye from the color at the center of the MacAdam ellipse 430. Similarly, the colors captured along the contour (e.g., perimeter or boundary) of the MacAdam ellipse 430 represent the "just noticeable differences" of chromaticity by a human eye. A MacAdam ellipse 430 is described as having "steps", which is equivalent to standard deviation, a. If a large sample of the population were used and if a trained observer could reliably repeat his observations, then the steps would translate to probabilities for the general population as follows: 1σ/1-step is 68.268%; 2σ/2-step is 95.449%; 3σ/3-step is 99.730%; 4σ/4-step is 99.993%; and 5σ/5-step is 99.999% of the general, color normal population. Any point on the contour of a "1-step" ellipse, drawn around a target, represents one standard deviation, 1σ, from the target. In other words, a line drawn from a point on the contour through the center point 435 and intersects an opposing point on the contour, and then the two points are 2σ from one another. The MacAdam ellipse 430 depicted in FIG. 4 is a 5-step MacAdam ellipse 430.

Still referring to FIG. 4, chromaticity results for light diffusing optical fibers having a spectral attenuation percent relative range of about 20% to about 0% were simulated using a white LED source. The chromaticity for each light diffusing optical fiber 100 having a spectral attenuation percent relative range of 20% to about 0% in +/−2% steps, that is for example, a light diffusing optical fiber 100 having a spectral attenuation percent relative range of about 0%, about 4% (spectral attenuation of about +/−2%), about 8%

(+/−4%), about 12% (+/−6%), about 16% (+1-8%) and about 20% (+1-10%). Each resulting chromaticity is represented by a triangle shape on the on the CIE 1976 chromaticity space 400. Together the resulting chromaticity, i.e. the triangle shapes, is referred to as the chromaticity spread 420. For example, in FIG. 4 the chromaticity spread 420 is for a white LED source input into each light diffusing optical fiber 100 having a spectral attenuation percent relative range of 20% to about 0% in +/−2% steps, that is a light diffusing optical fiber 100 having a spectral attenuation percent relative range of about 0%, about 4% (+/−2%), about 8% (+/−4%), about 12% (+/−6%), about 16% (+/−8%) and about 20% (+/−10%), respectively.

Applying a MacAdam ellipse 430, for example a 5-step MacAdam ellipse 430, with the target, i.e., center of the ellipse, at the result for a light diffusing optical fiber 100 having a spectral attenuation percent relative range of about 0%, the plot shows that about 50% of the chromaticity spread 420 (i.e., indicated by triangle shapes) lays inside of the MacAdam ellipse 430. While not intending to be limited by theory, this suggests that a light diffusing optical fiber 100 having a spectral attenuation percent relative range of about 8% (i.e., +/−4%) will not render a difference in chromaticity that is noticeable to the human observer. The spectral attenuation percent relative range value of about 8% may be more readily quantified from the same results plotted in FIG. 5.

Figure 5:
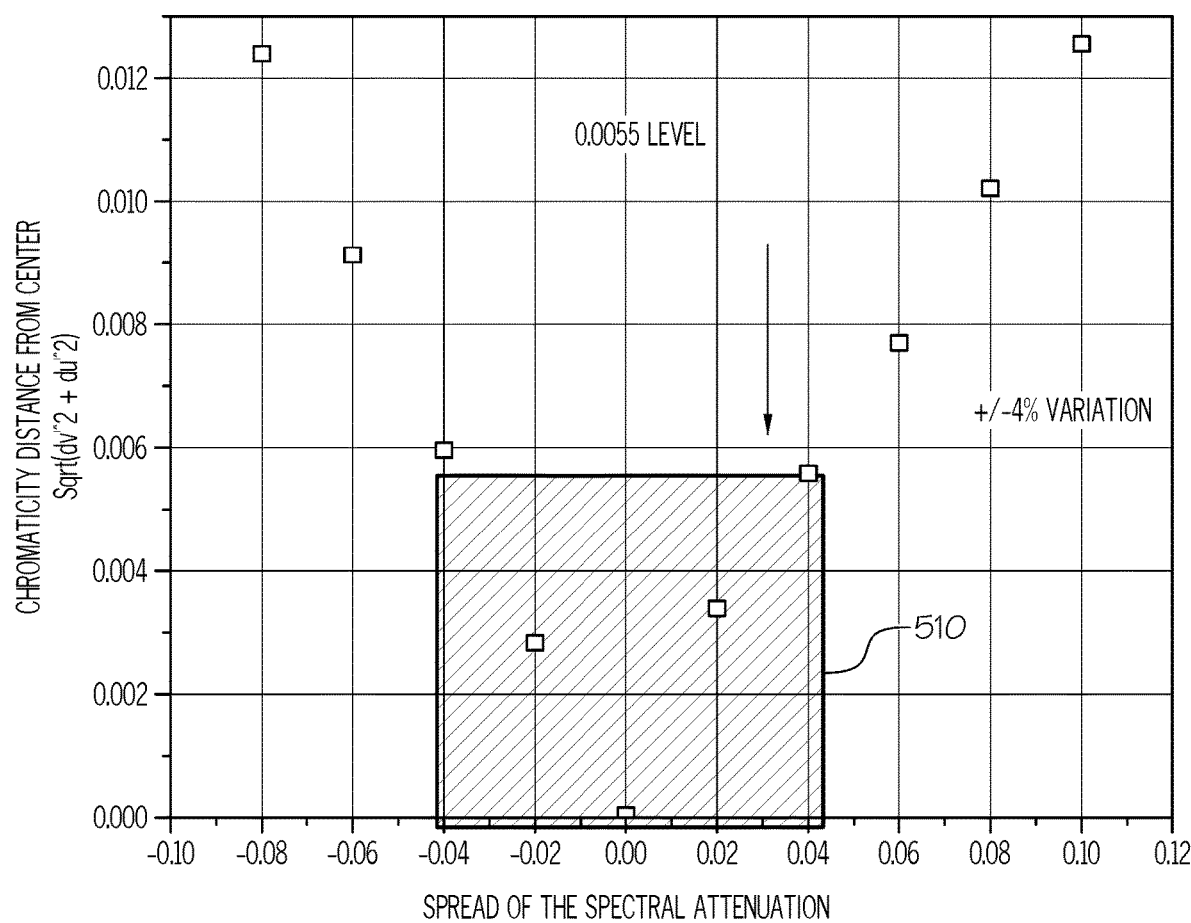
FIG. 5 graphically depicts chromaticity distances vs. the spread of spectral attenuation for a light diffusing optical fiber, according to one or more embodiments shown and described herein.

Referring to FIG. 5, the chromaticity distances from the center point 435 of the MacAdam ellipse 430 to each chromaticity of the chromaticity spread 420 in FIG. 4 versus spectral attenuation is depicted. By configuring the box 510 to capture the chromaticity spread 420 within the MacAdam ellipse 430 depicted in FIG. 4, it can be observed that a light diffusing optical fiber 100 having a spectral attenuation percent relative range of about 8% (i.e., spectral attenuation of ±4%) does not render a noticeable difference in chromaticity. The box 510 also defines a variation in chromaticity distances of about ±0.0055. This variation in chromaticity distances correlates to a good chromaticity uniformity. In some embodiments, a variation in chromaticity distances (e.g., Duv) of about ±0.006 or less, or about ±0.005 or less, or about ±0.004 or less, or about ±0.003 or less, or about ±0.002 or less, or about ±0.001 or less is consistent with good chromaticity uniformity along the length (e.g., the diffusion length) of the light diffusing optical fiber 100. While FIG. 4 and FIG. 5 depict simulation results for a white LED source, a similar analysis may be used for other colors. Additionally, while not intending to be limited by theory, a chromaticity distance of ±0.006 or less corresponds to a 7-step MacAdam ellipse and is the American National Standard's (ANSI C78.377) definition for acceptable color coordinates changes. With a spectral attenuation variation of less than ±4%, the difference in color should not be observable.

In the case of non-white-light light source, generally the same targets in variation of color points, i.e. chromaticity distance of less than or equal to about ±0.006 can be used. However, for non-white light the human eye is less sensitive to color changes, therefore more relaxed target chromaticity distances such as less than or equal to about ±0.01 or ±0.013 can be used depending on the color point to achieve uniform or unnoticeable changes in chromaticity. However, in the case of non-white-light the spectral range for the emitting source may be narrower, thus spectral variation within a narrower spectral range may already be accounted for when tuned for a white-light light source. For example, if the spectral requirements are satisfied for white light, they may most likely be satisfied for a non-white-light light source.

Moreover, while not intending to be limited by theory, the variation in chromaticity may also translate into a variation in CCT along the light diffusing optical fiber 100. Referring again to FIG. 4, the change in CCT (ΔCCT) across the portion of the chromaticity spread 420 that is bounded by the MacAdam ellipse 430 is observed as approximately ±420K with an average correlated color temperature of about 5580K. As discussed above, CCT is a way of describing the color appearance of a chromaticity. A ΔCCT affects how warm or cool a chromaticity appears. If a light diffusing optical fiber 100 effects a ΔCCT along the diffusion length of a light diffusing optical fiber 100 then the light source with a specific chromaticity input into the light diffusing optical fiber 100 may become warmer or cooler along the diffusion length thereby changing the appearance of the chromaticity of light emitted from a light diffusing optical fiber 100 along the diffusion length. While a noticeable difference in a ΔCCT for a specific light source depends on chromaticity, a smaller ΔCCT is generally less noticeable, for example less than ±500K, ±450K, ±400K, ±350K, ±300K, ±250K, ±200K, ±150K, ±100K, or ±50K. A noticeable difference may correlate to the average CCT as shown. For example, without limitation, in FIG. 4 the ΔCCT within the MacAdam ellipse 430 is approximately ±420K from the center point 435 having a CCT of 5580K. Consequently, a ΔCCT of approximately ±420K from the chromaticity defined by center point 435 should not render a noticeable difference in the appearance of chromaticity along the diffusion length of a light diffusing optical fiber 100 having a spectral attenuation percent relative range of about 8% (i.e., spectral attenuation of ±4%).

Figure 6:
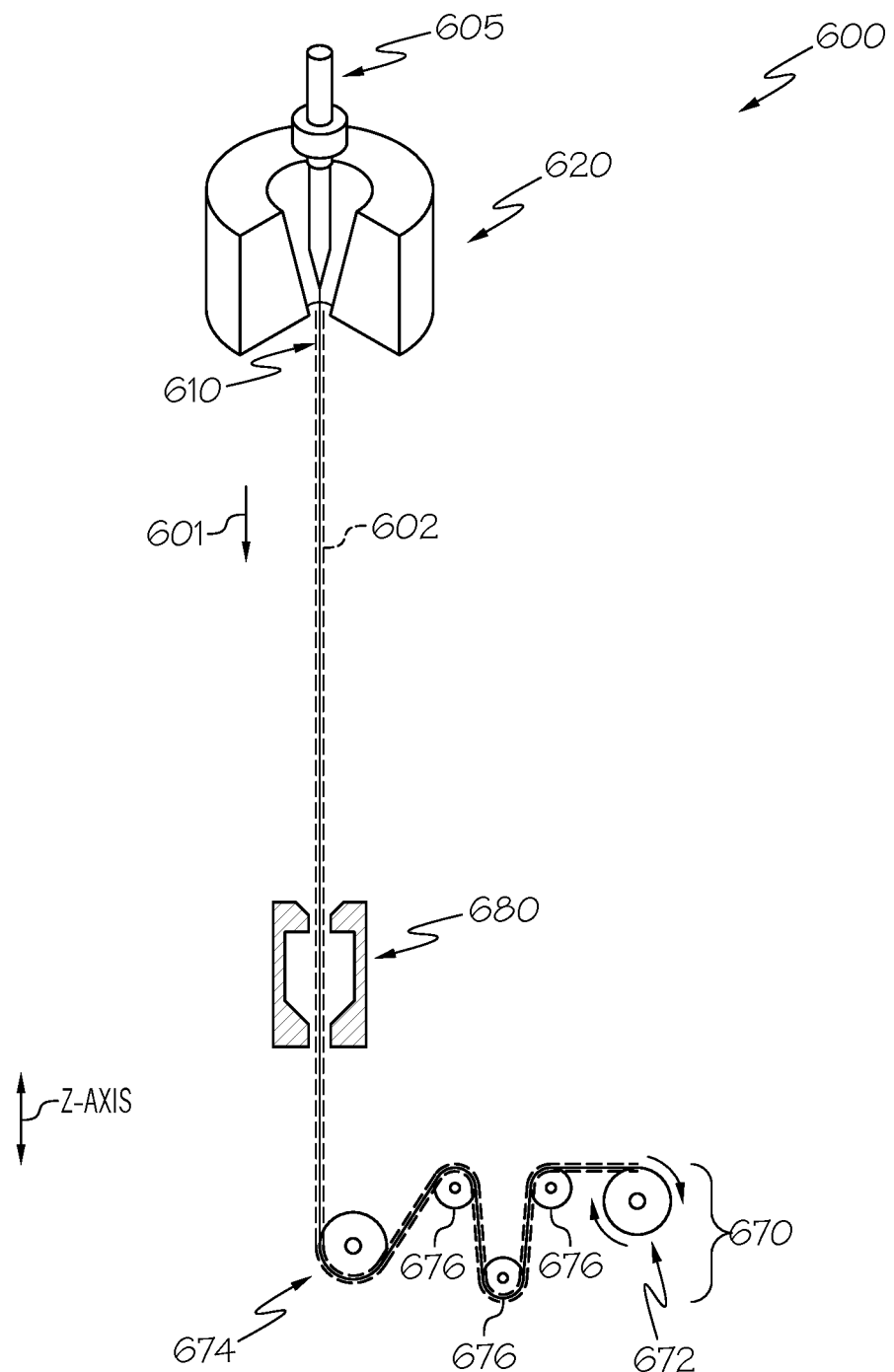
FIG. 6 schematically illustrates an optical fiber production system for producing a light diffusing optical fiber, according to one or more embodiments described herein.
Figure 7:
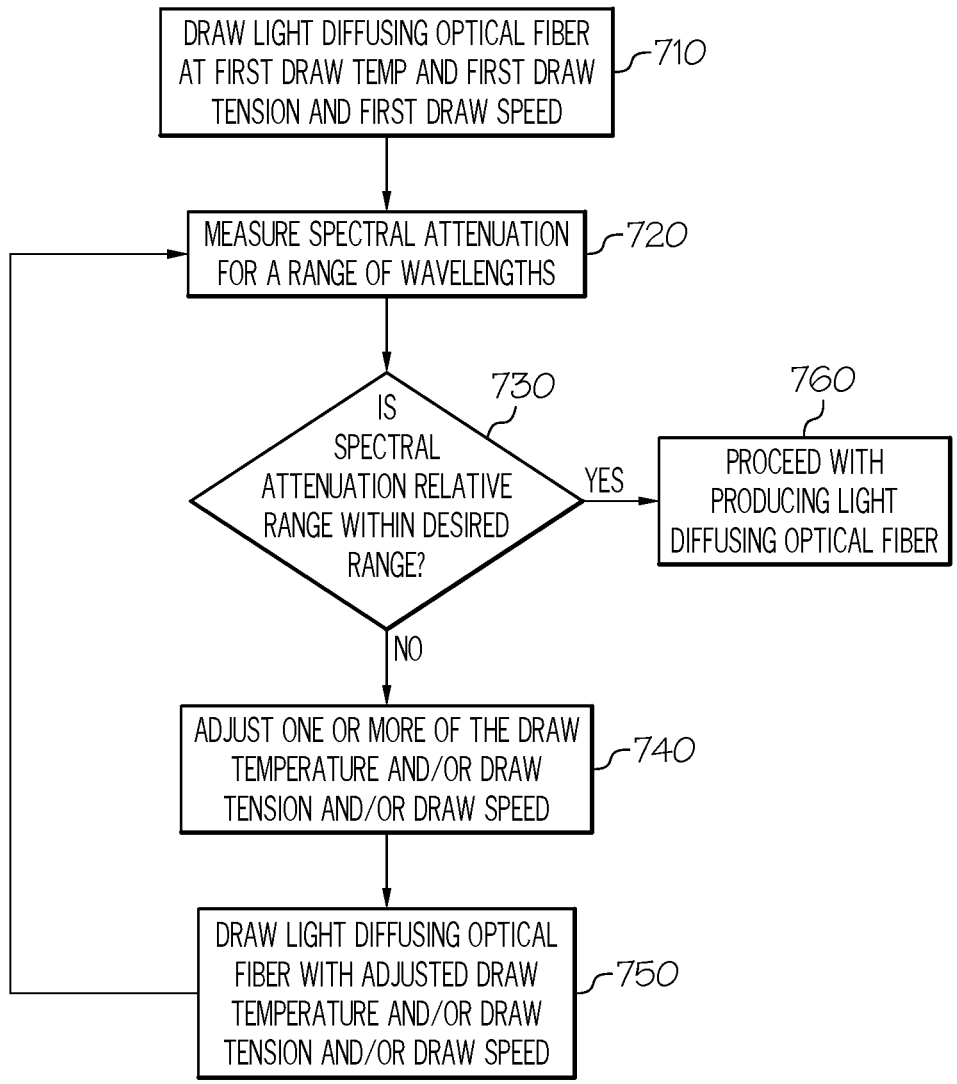
FIG. 7 is a flowchart depicting a method of tuning the draw process for producing a light diffusing optical fiber with a spectral attenuation percent relative range of about 15% or less, according to one or more embodiments described herein.

Referring now to FIGS. 6 and 7, a spectral attenuation percent relative range of about 15% or less in the light diffusing optical fiber may be achieved by controlling the draw process during formation of the light diffusing optical fiber, for example, using an optical fiber production system 600 configured to produce a light diffusing optical fiber 610. Accordingly, a method of manufacturing the light diffusing optical fiber 610 such that the light diffusing optical fiber 610 comprises a spectral attenuation percent relative range of about 15% or less includes the steps of controlling at least one of the draw temperature, draw tension, and draw speed of the light diffusing optical fiber 610 during the draw process, as described below. Further, the light diffusing optical fiber 610 formed using the methods of manufacturing described below also comprises uniform CCTs and chromaticity distances of light emitted from a light diffusing optical fiber 610 along the diffusion length of the light diffusing optical fiber 610. Moreover, it should be understood that the light diffusing optical fiber 610 depicted in FIG. 6 may comprise any of the embodiments of the light diffusing optical fiber 100, described above.

As depicted in FIG. 6, the optical fiber production system 600 comprises a draw furnace 620, a fiber collection unit 670, and optionally a fiber coating unit 680. A draw pathway 602 extends from the draw furnace 620 to the fiber collection unit 670 and is the pathway along which the light diffusing optical fiber 610 travels during production, for example, in a draw direction 601. As depicted in FIG. 6, an optical fiber preform 605 is placed in the draw furnace 620. The optical fiber preform 605 may be constructed of any glass or material suitable for the manufacture of optical fibers. In operation, the draw furnace 620 may heat the optical fiber preform 605 such that the light diffusing optical fiber 610 may be drawn from the optical fiber preform 605. The draw furnace 620 may be oriented along the draw pathway 602, which may be a vertical pathway, such that the light diffusing optical fiber 610 drawn from the optical fiber preform 605 exits the draw furnace 620 along the draw pathway 602 in the draw direction 601, which may be a downward direction. By orienting the draw furnace 620 in a vertical direction, the light diffusing optical fiber 610 may be drawn from the optical fiber preform 605 by the weight of the optical fiber preform 605 as the optical fiber preform 605 softens due to the temperature of the draw furnace 620 and, in some embodiments, by tension applied to the light diffusing optical fiber 610, and thereby applied to the optical fiber preform 605, by the fiber collection unit 670.

Referring still to FIG. 6, in some embodiments, the optical fiber production system 600 further comprises a fiber coating unit 680 positioned along the draw pathway 602, for example, between the draw furnace 620 and the fiber collection unit 670. The fiber coating unit 680 may apply one or more coating layers to the light diffusing optical fiber 610 as the light diffusing optical fiber 610 traverses the fiber coating unit 680. For example, the fiber coating unit 680 may apply one or more of a thermoplastic coating, such as a polyethylene, polypropylene, fluorinated ethylene polypropylene, nylon, polyvinyl chloride or similar thermoplastic material, a UV curable coating, such as a UV-curable acrylate coating, or the like. It should be understood that the fiber coating unit 680 may be any suitable coating unit for applying one or more coatings to an optical fiber as may be presently known in the art or subsequently developed.

Referring still to FIG. 6, in some embodiments, after coating the light diffusing optical fiber 610 in the fiber coating unit 680, the light diffusing optical fiber 610 may be wound onto a fiber storage spool 672 with a fiber collection unit 670. The fiber collection unit 670 utilizes drawing mechanisms 676 and tensioning pulleys 674 to facilitate winding the light diffusing optical fiber 610 onto the fiber storage spool 672. The tensioning pulleys 674 may provide the necessary tension to the light diffusing optical fiber 610 as the light diffusing optical fiber 610 is drawn through the optical fiber production system 600. Accordingly, the fiber collection unit 670 may directly contact the light diffusing optical fiber 610 in order to both wind the light diffusing optical fiber 610 onto fiber storage spool 672 as well as to provide the desired tension on the light diffusing optical fiber 610 as it is drawn along the draw pathway 602, for example, through the draw furnace 620, and the fiber coating unit 680.

Further, the draw temperature, the draw tension, and the draw speed applied to the light diffusing optical fiber 610 during manufacture of the light diffusing optical fiber 610 may control the resultant spectral attenuation percent relative range of the light diffusing optical fiber 610. In particular, altering one or more of the draw temperature, the draw tension, and the draw speed may alter the resultant character (e.g., shape and distribution) of the scattering structures 115, such as gas-filled voids within the light diffusing optical fiber 610 and as such alter the resultant spectral attenuation percent relative range of the light diffusing optical fiber 610.

For example, in one embodiment, the optical fiber preform 605 is heated within the draw furnace 620 to a draw temperature of about 2100 degrees Celsius (° C.) and drawn at a draw speed of about 18 m/minute. Further, in this example embodiment, the drawing mechanisms 676 and the tensioning pulleys 674 of the fiber collection unit 670 may apply a draw tension of about 1 gram to about 2 grams of tension. In some embodiments, the draw temperature may comprise from 1800° C. to about 2500° C., for example about 1800° C., 1850° C., 1900° C., 1950° C., 2000° C., 2050° C., 2100° C., 2150° C., 2200° C., 2250° C., 2300° C., 2350° C., 2400° C., 2450° C., or the like. The draw temperature may depend on the length (e.g., along the Z-axis) of the draw furnace 620. As one example, when the draw furnace 620 comprises a large length, a lower draw temperature may be desirable as the optical fiber preform 605 either spends more time in the draw furnace 620 or is drawn under an increased draw tension (e.g., to speed up the traversal of the optical fiber preform 605 through the draw furnace 620). In some embodiments, the draw tension may comprise from about 0 grams to about 200 grams, for example, 1 gram, 2 grams, 3 grams, 4 grams, 5 grams, 6 grams, 7 grams, 8 grams, 9 grams, 10 grams, 20 grams, 30 grams, 40 grams, 50 grams, 60 grams, 70 grams, 80 grams, 90 grams, 100 grams, 110 grams, 120 grams, 130 grams, 140 grams, 150 grams, 160 grams, 170 grams, 180 grams, 190 grams, or less than or equal to 200 grams. Further, in some embodiments, the draw speed may be from about 10 m/min to about 25 m/min, for example about 12 m/min, about 14 m/min, about 16 m/min, about 18 m/min, about 20 m/min, about 22 m/min, about 24 m/min, or the like, In embodiments in which the scattering structures 115 comprise gas-filled voids, heating the optical fiber preform 605 in the draw furnace 620 alters the distribution, volume, shape, and length of the gas-filled voids and also causes coalescence (e.g., merger) of adjacent gas-filled voids. The distribution of scattering structures 115 that comprise gas-filled voids having a variety of shapes and sizes controls the spectral efficiency of light scattering. A tuned distribution of gas-filled void sizes for a given glass preform, which may also include optimizing the distribution of where the gas-filled voids start, helps to control the resultant spectral attenuation of the light diffusing optical fiber 610. Further, the above example draw temperatures, draw tensions, and the draw speeds provide non-exhaustive examples and, in some embodiments, further tuning of the draw temperature, draw tension, and draw speed may be performed to achieve a desired draw process that produces a light diffusing optical fiber 610 with a spectral attenuation percent relative range of about 15% or less.

Referring now to FIG. 7, a flowchart for a method of tuning the draw process for producing the light diffusing optical fiber 610 having a spectral attenuation percent relative range of about 15% or less is depicted. At step 710, the method comprises drawing a first length of light diffusing optical fiber 100 with a first draw tension, a first draw speed, and a first draw temperature using, for example, the optical fiber production system 600 as described and depicted with respect to FIG. 6. The first length of light diffusing optical fiber may comprise a first void volume fraction of gas-filed voids at a selected cross-section along the diffusion length of the light diffusing optical fiber and the plurality of gas-filed voids at the selected cross-section along the diffusion length may comprise a first average cross-sectional size.

At step 720, the spectral attenuation across a range of wavelengths input into the length of light diffusing optical fiber 610 is measured, for example, by directing light from a light source into the light diffusing optical fiber 610 and measuring the spectral attenuation percent relative range of light that diffuses through the outer surface of the light diffusing optical fiber 610 to determine the spectral attenuation percent relative range of the light diffusing optical fiber 610. Next, at step 730, the method includes determining if the spectral attenuation percent relative range is within the desired range (e.g., less than or equal to 15%, 12%, 10%, 8%, 6%, 5%, 4%, 3%, 2%, 1%, or the like. Further, if the measured spectral attenuation relative range is within the desired range, the method proceeds to step 760 and the first draw tension, the first draw speed, and the first draw temperature are used in the formation of additional light diffusing optical fibers 610, for example, in a full production run of the light diffusing optical fiber 610.

Alternatively, if the determined spectral attenuation percent relative range of the light diffusing optical fiber 100 is not within the desired range, the method proceeds to step 740, which comprises adjusting one of more of the draw tension, the draw speed, and the draw temperature to one or more of a second draw tension, a second draw speed, and/or or a second draw temperature. The second draw tension may be greater than, less than or equal to the first draw tension. The second draw speed may be greater than, less than or equal to the first draw speed. The second draw temperature may be greater than, less than or equal to the first draw speed. In some embodiments, at least one of the second draw tension, second draw speed and second draw temperature is different than the first draw tension, first draw speed and first draw temperature depending on whether the determined spectral attenuation percent relative is within the desired range.

Then, at step 750, the method comprises drawing a second length of the light diffusing optical fiber 610. The second length of light diffusing optical fiber may comprise a second void volume fraction of gas-filed voids at a selected cross-section along the diffusion length of the light diffusing optical fiber and a plurality of gas-filed voids at the selected cross-section along the diffusion length may comprise a second average cross-sectional size. The second void volume fraction of gas-filled voids and second average cross-sectional size of the plurality of gas-filled voids may be different than the first void volume fraction of gas-filled voids and the first average cross-sectional size of the plurality of gas-filled voids.

Once the second length of the light diffusing optical fiber 610 is drawn, step 720 is repeated and the spectral attenuation across a range of wavelengths input into the length of light diffusing optical fiber 610 is measured to determine the spectral attenuation percent relative range of the second length of the light diffusing optical fiber 610. Next, the method proceeds to step 730, which comprises determining if the spectral attenuation percent relative range of the second length of the light diffusing optical fiber 610 is within the desired range. If the measured spectral attenuation relative range of the second length of the light diffusing optical fiber 610 is within the desired range, the method proceeds to step 760 and the second draw tension, the second draw speed, and the second draw temperature are used in the formation of additional light diffusing optical fibers 610. Alternatively, if the determined spectral attenuation percent relative range of the second length of the light diffusing optical fiber 610 is not within the desired range, the method proceeds again to steps 740 then 750, and the process is repeated for additional draw tensions, draw speeds, and/or draw temperatures.

In some embodiments, the measurements of the spectral attenuation percent relative range, the void volume fraction, or the average cross sectional size for the first length of the light diffusing optical fiber 610 and the second length of the light diffusing optical fiber 610 may be taken at corresponding locations along the diffusion length of the light diffusing optical fiber 100 (i.e., the measurements may be taken at the same distance from the first end 112 the light diffusing optical fiber 100). In other embodiments, the measurements of the spectral attenuation percent relative range, the void volume fraction, or the average cross sectional size for the first length of the light diffusing optical fiber 610 and the second length of the light diffusing optical fiber 610 may be taken at any location along the diffusion length of the light diffusing optical fiber 610.

While not intending to be limited by theory, a decrease in the draw tension may result in higher attenuation for shorter wavelengths of light propagating along the light diffusing optical fiber and an increase in draw temperature may result in higher attenuation for longer wavelengths of light propagating along the light diffusing optical fiber. In other words, draw temperature and draw tension share an inverse relationship. Furthermore, draw speed and draw temperature share a direct relationship and thus when one is increased the other is increased and when one is decreased the other is decreased. Moreover, the occurrences of starts and stops in the scattering structures 115, which results in higher scattering efficiency and uniform wavelength dependence along the length of the light diffusing optical fiber 100, may be achieved by a low draw temperature and low draw tension as discussed herein.

Figure 8:
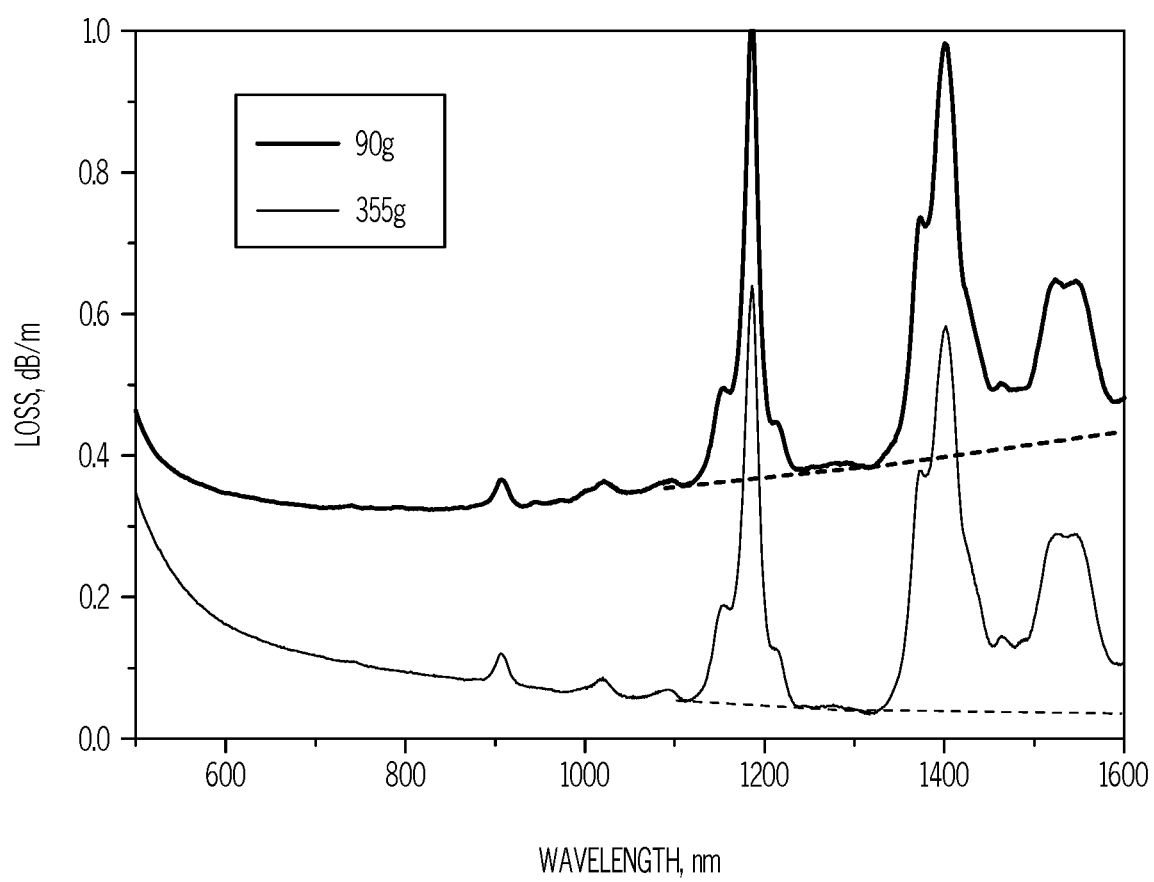
FIG. 8 graphically depicts two spectral curves as a result of different draw tensions according to one or more embodiments described herein.

For example, FIG. 8 graphically depicts the spectral curves of two light diffusing optical fibers each drawn at a different draw tension (i.e., 90 grams and 355 grams), at the same draw speed and the same draw temperature. As shown, when the draw speed and draw temperature are constant but the draw tensions differ, i.e., one is greater than the other, the light diffusing optical fiber drawn with a higher draw tension comprises a lower spectral curve. In the example represented by the results in FIG. 8, the draw furnace was set to a draw temperature of 1900° C. and the draw speed was 10 m/s. A similar effect can be achieved by holding the draw tension constant and varying the draw temperature (e.g., drawing the two light diffusing optical fibers at different temperatures). For example, without limitation, varying the draw temperature from 1900° C. to about 2200° C. while maintaining the draw speed at about 1 m/s and the draw tension from about 1 gram to about 2 grams increases the scattering loss (i.e. the scattering induced attenuation). However, when the draw speed is increased from about 1 m/s to about 5 m/s, the spectral response of the light diffusing optical fiber drawn at the higher draw speed is more flat (i.e. comprises a smaller spectral attenuation relative range) than the light diffusing optical fiber drawn at the lower draw speed.

Aspect (1) of this disclosure pertains to a light diffusing optical fiber comprising: a core; a cladding surrounding the core; an outer surface; and a plurality of scattering structures positioned within the core, the cladding, or both the core and the cladding, wherein the plurality of scattering structures are configured to scatter guided light towards the outer surface, such that light comprising a wavelength of from about 450 nm to about 650 nm diffusing through the outer surface along a diffusion length of the light diffusing optical fiber comprises a spectral attenuation percent relative range of about 15% or less.

Aspect (2) pertains to the fiber of Aspect (1), wherein the spectral attenuation percent relative range of the light diffusing through the outer surface along the diffusion length of the light diffusing optical fiber comprises about 8% or less.

Aspect (3) pertains to the fiber of Aspect (1) or Aspect (2), wherein the spectral attenuation percent relative range of the light diffusing through the outer surface along the diffusion length of the light diffusing optical fiber comprises about 3% or less.

Aspect (4) pertains to the fiber of any one of Aspects (1) through (3), wherein a correlated color temperature of the light diffusing through the outer surface along the diffusion length of the light diffusing optical fiber comprises from about 2500 K to about 8000 K.

Aspect (5) pertains to the fiber of any one of Aspects (1) through (4), wherein a correlated color temperature of the light diffusing through the outer surface along the diffusion length of the light diffusing optical fiber comprises from about 5160 K to about 6000 K.

Aspect (6) pertains to the fiber of any one of Aspects (1) through (5), wherein the plurality of scattering structures comprise a plurality of gas-filled voids.

Aspect (7) pertains to the fiber of Aspect (6), wherein the plurality of gas-filled voids comprise a non-spherical taper shape.

Aspect (8) pertains to the fiber of Aspect (6), wherein the plurality of gas-filled voids comprise a cross sectional size of from about 50 nm to about 10 μm.

Aspect (9) pertains to the fiber of Aspect (6), wherein the plurality of gas-filled voids comprise a length from about 1 mm to about 100 m.

Aspect (10) pertains to the fiber of any one of Aspects (1) through (9), wherein an intensity of the light diffusing through the outer surface along the diffusion length of the light diffusing optical fiber does not vary by more than about 30%.

Aspect (11) pertains to the fiber of any one of Aspects (1) through (10), wherein the plurality of scattering structures are configured to scatter a portion of the guided light toward the outer surface of the light diffusing optical fiber such that a portion of the guided light diffuses through the outer surface of the light diffusing optical fiber along the diffusion length of the light diffusing optical fiber to provide a scattering induced attenuation of about 50 dB/km or more.

Aspect (12) pertains to the fiber of any one of Aspects (1) through (11), wherein the light diffusing optical fiber further comprises a secondary scattering layer surrounding the core and the cladding; and the secondary scattering layer comprises a base material and a scattering material and is configured such that a difference between a minimum and maximum scattering illumination intensity is less than 50% of the maximum scattering illumination intensity, for all viewing angles from about 40 to about 120 degrees.

Aspect (13) pertains to a method for producing a light diffusing optical fiber comprising: drawing the light diffusing optical fiber from an optical fiber preform in a draw furnace along a draw pathway, wherein drawing the light diffusing optical fiber comprises: heating the optical fiber preform at a draw temperature within the draw furnace; and applying a draw tension to the light diffusing optical fiber such the light diffusing optical fiber comprises: a core; a cladding surrounding the core; an outer surface; and a plurality of scattering structures positioned within the core, the cladding, or both the core and the cladding, wherein the plurality of scattering structures are configured to scatter guided light towards the outer surface, such that light comprising a wavelength of from about 450 nm to about 560 nm diffusing through the outer surface along a diffusion length of the light diffusing optical fiber comprises a spectral attenuation percent relative range of about 15% or less and a correlated color temperature of from about 2700 K to about 8000 K.

Aspect (14) pertains to the method of Aspect (13), wherein the draw temperature is from about 1800° C. to about 2300° C.

Aspect (15) pertains to the method of Aspect (13) or Aspect (14), wherein the draw tension is from about 1 gram to about 200 grams.

Aspect (16) pertains to a method comprising; drawing a first light diffusing optical fiber from an optical fiber preform in a draw furnace along a draw pathway at a first draw speed, wherein drawing the first light diffusing optical fiber comprises: heating the optical fiber preform at a first draw temperature within the draw furnace; and applying a first draw tension to the first light diffusing optical fiber such that the first light diffusing optical fiber comprises: a core; a cladding surrounding the core; an outer surface; and a plurality of gas-filled voids positioned within the core, the cladding, or both the core and the cladding, wherein the plurality of gas-filled voids comprise a first void volume fraction and a first average cross sectional size; directing light from a light source into the first light diffusing optical fiber such that a portion of the light diffuses through the outer surface of the first light diffusing optical fiber; measuring a spectral attenuation percent relative range of the light diffusing through the outer surface of the first light diffusing optical fiber; drawing a second light diffusing optical fiber from the optical fiber preform into the draw furnace along the draw pathway at a second draw speed, wherein drawing the second light diffusing optical fiber comprises: heating the optical fiber preform at a second draw temperature within the draw furnace; and applying a second draw tension to the second light diffusing optical fiber such that the second light diffusing optical fiber comprises: a core; a cladding surrounding the core; an outer surface; and a plurality of scattering structures positioned within the core, the cladding, or both the core and the cladding, wherein the plurality of scattering structures comprise a second void volume fraction and a second average cross sectional diameter and are configured to scatter guided light towards the outer surface, such that light comprising a wavelength of from about 450 nm to about 560 nm diffusing through the outer surface along a diffusion length of the second light diffusing optical fiber comprises a second spectral attenuation percent relative range that is about 15% or less and is less than the spectral attenuation percent relative range of the first light diffusing optical fiber.

Aspect (17) pertains to the method of Aspect (16), wherein the first draw tension is different than the second draw tension and the first draw temperature is different than the second draw temperature.

Aspect (18) pertains to the method of Aspect (16) or Aspect (17), wherein at least one of the second draw tension and the second draw temperature is lower than the first draw tension and the first draw temperature, respectively.

Aspect (19) pertains to the method of any one of Aspects (16) through (18), wherein at least one of the second draw tension and the second draw temperature is higher than the first draw tension and the first draw temperature, respectively.

Aspect (20) pertains to the method of any one of Aspects (16) through (19), wherein the second spectral attenuation percent relative range of the second light diffusing through the outer surface along the diffusion length of the second light diffusing optical fiber comprises about 8% or less.

For the purposes of describing and defining the present technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A light diffusing optical fiber comprising:
   a core;
   a cladding surrounding the core;
   an outer surface; and
   a plurality of scattering structures positioned within the core, the cladding, or both the core and the cladding, wherein the plurality of scattering structures are configured to scatter guided light towards the outer surface, such that light comprising a wavelength of from 450 nm to 650 nm diffusing through the outer surface along a diffusion length of the light diffusing optical fiber comprises a spectral attenuation percent relative range of 14% or less.

2. The light diffusing optical fiber of claim 1, wherein the spectral attenuation percent relative range of the light diffusing through the outer surface along the diffusion length of the light diffusing optical fiber comprises 8% or less.

3. The light diffusing optical fiber of claim 1, wherein the spectral attenuation percent relative range of the light diffusing through the outer surface along the diffusion length of the light diffusing optical fiber comprises 3% or less.

4. The light diffusing optical fiber of claim 1, wherein a correlated color temperature of the light diffusing through the outer surface along the diffusion length of the light diffusing optical fiber comprises an average in the range from 2500 K to 8000 K and a change of correlated color temperature within ±500 K of the average.

5. The light diffusing optical fiber of claim 1, wherein a correlated color temperature of the light diffusing through the outer surface along the diffusion length of the light diffusing optical fiber comprises an average in the range from 5160 K to 6000 K and a change of correlated color temperature within ±420 K of the average.

6. The light diffusing optical fiber of claim 1, wherein the plurality of scattering structures comprise a plurality of gas-filled voids.

7. The light diffusing optical fiber of claim 6, wherein the plurality of gas-filled voids comprise a non-spherical taper shape.

8. The light diffusing optical fiber of claim 6, wherein the plurality of gas-filled voids comprise a cross sectional size of from 50 nm to 10 µm.

9. The light diffusing optical fiber of claim 6, wherein the plurality of gas-filled voids comprise a length from 1 mm to 100 m.

10. The light diffusing optical fiber of claim 1, wherein an intensity of the light diffusing through the outer surface along the diffusion length of the light diffusing optical fiber does not vary by more than 30%.

11. The light diffusing optical fiber of claim 1, wherein the plurality of scattering structures are configured to scatter a portion of the guided light toward the outer surface of the light diffusing optical fiber such that a portion of the guided light diffuses through the outer surface of the light diffusing optical fiber along the diffusion length of the light diffusing optical fiber to provide a scattering induced attenuation of 50 dB/km or more.

12. The light diffusing optical fiber of claim 1, wherein:
   the light diffusing optical fiber further comprises a secondary scattering layer surrounding the core and the cladding; and
   the secondary scattering layer comprises a base material and a scattering material and is configured such that a difference between a minimum and maximum scattering illumination intensity is less than 50% of the maximum scattering illumination intensity, for all viewing angles from 40 to 120 degrees.

13. A method for producing a light diffusing optical fiber comprising:
   drawing the light diffusing optical fiber from an optical fiber preform in a draw furnace along a draw pathway, wherein drawing the light diffusing optical fiber comprises:
      heating the optical fiber preform at a draw temperature within the draw furnace; and
      applying a draw tension to the light diffusing optical fiber such the light diffusing optical fiber comprises:
         a core;
         a cladding surrounding the core;
         an outer surface; and
         a plurality of scattering structures positioned within the core, the cladding, or both the core and the cladding, wherein the plurality of scattering structures are configured to scatter guided light towards the outer surface, such that light comprising a wavelength of from 450 nm to 650 nm diffusing through the outer surface along a diffusion length of the light diffusing optical fiber comprises a spectral attenuation percent relative range of 14% or less and a correlated color temperature of from about 2700 K to about 8000 K.

14. The method for producing a light diffusing optical fiber of claim 13, wherein the draw temperature is from about 1800° C. to about 2300° C.

15. The method for producing a light diffusing optical fiber of claim 13, wherein the draw tension is from about 1 gram to about 200 grams.

16. A method comprising;
drawing a first light diffusing optical fiber from an optical fiber preform in a draw furnace along a draw pathway at a first draw speed, wherein drawing the first light diffusing optical fiber comprises:
heating the optical fiber preform at a first draw temperature within the draw furnace; and
applying a first draw tension to the first light diffusing optical fiber such that the first light diffusing optical fiber comprises:
a core;
a cladding surrounding the core;
an outer surface; and
a plurality of gas-filled voids positioned within the core, the cladding, or both the core and the cladding, wherein the plurality of gas-filled voids comprise a first void volume fraction and a first average cross sectional size;
directing light from a light source into the first light diffusing optical fiber such that a portion of the light diffuses through the outer surface of the first light diffusing optical fiber;
measuring a spectral attenuation percent relative range of the light diffusing through the outer surface of the first light diffusing optical fiber;
drawing a second light diffusing optical fiber from the optical fiber preform into the draw furnace along the draw pathway at a second draw speed, wherein drawing the second light diffusing optical fiber comprises:
heating the optical fiber preform at a second draw temperature within the draw furnace; and
applying a second draw tension to the second light diffusing optical fiber such that the second light diffusing optical fiber comprises:
a core;
a cladding surrounding the core;
an outer surface; and
a plurality of scattering structures positioned within the core, the cladding, or both the core and the cladding, wherein the plurality of scattering structures comprise a second void volume fraction and a second average cross sectional diameter and are configured to scatter guided light towards the outer surface, such that light comprising a wavelength of from 450 nm to 650 nm diffusing through the outer surface along a diffusion length of the second light diffusing optical fiber comprises a second spectral attenuation percent relative range that is 14% or less and is less than the spectral attenuation percent relative range of the first light diffusing optical fiber.

17. The method of claim 16, wherein the first draw tension is different than the second draw tension and the first draw temperature is different than the second draw temperature.

18. The light diffusing optical fiber of claim 16, wherein at least one of the second draw tension and the second draw temperature is lower than the first draw tension and the first draw temperature, respectively.

19. The light diffusing optical fiber of claim 16, wherein at least one of the second draw tension and the second draw temperature is higher than the first draw tension and the first draw temperature, respectively.

20. The light diffusing optical fiber of claim 16, wherein the second spectral attenuation percent relative range of the second light diffusing through the outer surface along the diffusion length of the second light diffusing optical fiber comprises 8% or less.

* * * * *